(12) United States Patent
Kaufman et al.

(10) Patent No.: US 9,848,330 B2
(45) Date of Patent: Dec. 19, 2017

(54) DEVICE POLICY MANAGER

(71) Applicant: Microsoft Technology Licensing, LLC, Redmond, WA (US)

(72) Inventors: Peter J. Kaufman, Sammamish, WA (US); Yuhang Zhu, Bellevue, WA (US); John Chadwell Spaith, Bellevue, WA (US); Justin Hou, Seattle, WA (US); Sonia Prabhu, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 254 days.

(21) Appl. No.: 14/617,447

(22) Filed: Feb. 9, 2015

(65) Prior Publication Data

US 2015/0296368 A1 Oct. 15, 2015

Related U.S. Application Data

(60) Provisional application No. 61/977,600, filed on Apr. 9, 2014, provisional application No. 62/105,439, filed on Jan. 20, 2015.

(51) Int. Cl.
*H04W 8/18* (2009.01)
*H04W 12/08* (2009.01)
(Continued)

(52) U.S. Cl.
CPC ............ *H04W 12/08* (2013.01); *G06F 21/53* (2013.01); *G06F 21/604* (2013.01);
(Continued)

(58) Field of Classification Search
CPC ............ H04L 41/0866; H04L 41/0873; H04L 41/0893; H04W 12/08; H04W 4/001; H04W 8/18
See application file for complete search history.

(56) References Cited

U.S. PATENT DOCUMENTS 6,463,470 B1 * 10/2002 Mohaban ............ H04L 12/5695
709/223
7,757,268 B2   7/2010 Gupta et al.
(Continued)

FOREIGN PATENT DOCUMENTS

WO       2009021200 A1    2/2009

OTHER PUBLICATIONS

"International Preliminary Report on Patentability for PCT Patent Application No. PCT/US2015/023756", dated Jul. 12, 2016, 27 Pages.

(Continued)

*Primary Examiner* — Kashif Siddiqui
(74) *Attorney, Agent, or Firm* — Medley, Behrens & Lewis, LLC

(57) ABSTRACT

Various technologies described herein pertain to policy management on a mobile device. The mobile device includes a device policy manager system that includes a unified interface component and a policy handler component. The unified interface component is configured to receive policy configuration requests from multiple policy sources, including at least an internal policy source component executed by the mobile device and a device management server external to the mobile device. The policy configuration requests include at least a first policy configuration request (a first policy value for a policy) from a first policy source and a second policy configuration request (a second policy value for the policy) from a second policy source. The policy handler component is configured to resolve the conflict between the first and second policy values based on a conflict resolution technique to set a current policy value for the policy that controls the mobile device.

20 Claims, 8 Drawing Sheets

(51) Int. Cl.
H04L 12/24 (2006.01)
H04W 4/00 (2009.01)
G06F 21/53 (2013.01)
G06F 21/60 (2013.01)

(52) U.S. Cl.
CPC ...... *H04L 41/0873* (2013.01); *H04L 41/0893* (2013.01); *H04W 4/001* (2013.01); *G06F 2221/034* (2013.01); *G06F 2221/2101* (2013.01); *G06F 2221/2115* (2013.01); *G06F 2221/2141* (2013.01); *G06F 2221/2149* (2013.01)

(56) References Cited

U.S. PATENT DOCUMENTS

| 2005/0131712 | A1* | 6/2005 | Kaminsky | G06Q 10/10 709/229 |
| 2009/0164499 | A1 | 6/2009 | Samudrala et al. | |
| 2010/0043050 | A1 | 2/2010 | Nadalin et al. | |
| 2012/0054163 | A1 | 3/2012 | Liu et al. | |
| 2012/0166604 | A1* | 6/2012 | Fortier | H04L 41/0893 709/223 |
| 2012/0221955 | A1 | 8/2012 | Raleigh et al. | |
| 2012/0246731 | A1 | 9/2012 | Blaisdell et al. | |
| 2013/0297662 | A1 | 11/2013 | Sharma et al. | |

OTHER PUBLICATIONS

"Written Opinion for PCT Patent Application No. PCT/US2015/023756", dated Mar. 14, 2016, 9 Pages.

Bettini, et al., "Efficient Profile Aggregation and Policy Evaluation in a Middleware for Adaptive Mobile Applications", Pervasive and Mobile Computing, Elsevier, vol. 4, No. 5, Oct. 1, 2008, pp. 697-718.

Conti, et al., "CRePE: Context-Related Policy Enforcement for Android", In Proceedings of the 13th International Conference on Information Security, Oct. 25, 2010, pp. 331-345.

Mohan, et al., "An Attribute-Based Authorization Policy Framework with Dynamic Conflict Resolution", In Proceedings of the 9th Symposium on Identity and Trust on the Internet, Apr. 13, 2010, pp. 37-50.

"International Search Report (ISR) and Written Opinion for PCT Patent Application No. PCT/US2015/023756", dated Jun. 24, 2015, 15 Pages.

Desmet, et al., "A Flexible Security Architecture to Support Third-party Applications on Mobile Devices", Retrieved at: <<http://disi.unitn.it/~massacci/Publications/DESM-ETAL-08-ISTR.pdf>>, In Proceedings of the ACM Workshop on Computer Security Architecture, Nov. 2, 2007, 10 pages.

Lyle, et al., "Cross-Platform Access Control for Mobile Web Applications", Retrieved at: <<http://ieeexplore.ieee.org/stamp/stamp.jsp?tp=&arnumber=6267999>>, In IEEE International Symposium on Policies for Distributed Systems and Networks, Jul. 16, 2012, 8 pages.

Xu, et al., "Aurasium: Practical Policy Enforcement for Android Application", Retrieved at: <<https://www.usenix.org/system/files/conference/usenixsecurity12/sec12-final60.pdf>>, In Proceedings of the 21st USENIX Conference on Security Symposium, Aug. 8, 2012, 14 pages.

"Response to the International Search Report (ISR) and Written Opinion for PCT Patent Application No. PCT/US2015/023756", Filed Date: Nov. 25, 2015, 27 Pages.

"Response to the Office Action for European Patent Application No. 15719900.1", Filed Date: May 12, 2017, 18 Pages.

\* cited by examiner

DEVICE POLICY MANAGER

CROSS-REFERENCE TO RELATED APPLICATION

This application claims priority to U.S. Provisional Patent Application No. 61/977,600, filed on Apr. 9, 2014, and entitled "DEVICE POLICY MANAGER", and U.S. Provisional Patent Application No. 62/105,439, filed on Jan. 20, 2015, and entitled "DEVICE POLICY MANAGER", the entireties of which are incorporated herein by reference.

BACKGROUND

Policies enforced by a mobile device are typically controlled to secure and/or manage such mobile device. Oftentimes, multiple policy sources configure policy values of the mobile device. Many conventional approaches that enable multiple policy sources to configure policy values include a centralized policy server. A plurality of policy sources typically send policy configuration requests (including policy values for policies) to the centralized policy server. The centralized policy server can collect the policy values for the policies from the plurality of policy sources, arbitrate between such policy values for the policies, and send the policy values for the policies to a mobile device. Accordingly, with such server-based approaches, the centralized policy server manages the policy values obtained from the multiple policy sources, and the mobile device uses the policy values set by the centralized policy server.

Some other conventional approaches involve the mobile device receiving and handling a subset of the policy configuration requests, while a centralized policy server handles a remainder of the policy configuration requests. However, with such approaches, the mobile device is limited to managing a portion of the policy configuration requests, with a remainder of the policy configuration requests being handled off the mobile device. Accordingly, these traditional approaches are often complex and difficult to implement.

SUMMARY

Described herein are various technologies that pertain to policy management on a mobile device. The mobile device can include at least one processor and computer-readable storage, and the computer-readable storage can include a device policy manager system executable by the at least one processor. The device policy manager system can include a unified interface component configured to receive policy configuration requests from multiple policy sources. The multiple policy sources include at least an internal policy source component configured to be executed by the at least one processor of the mobile device and a device management server external to the mobile device. The policy configuration requests received by the unified interface component include at least a first policy configuration request from a first policy source and a second policy configuration request from a second policy source. The first policy configuration request includes a first policy value for a policy, and the second policy configuration request includes a second policy value for the policy. The first policy source differs from the second policy source, and the first policy value conflicts with the second policy value. Moreover, the device policy manager system includes a policy handler component configured to resolve the conflict between the first policy value and the second policy value for the policy based on a conflict resolution technique to set a current policy value for the policy that controls the mobile device.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
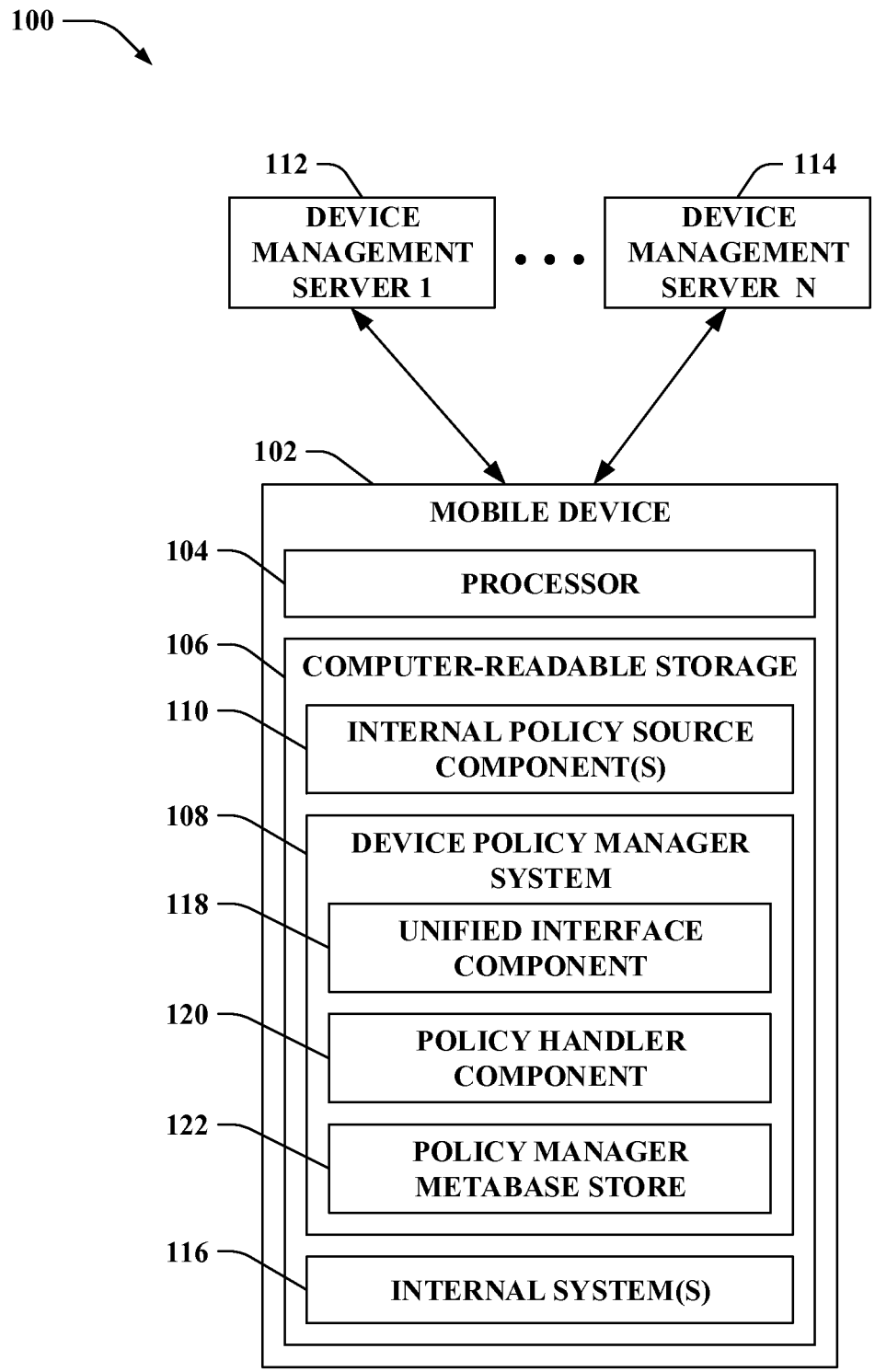
FIG. 1 illustrates a functional block diagram of an exemplary system that performs policy management on a mobile device.

Various technologies pertaining to handling of policy configuration requests for policies from multiple policy sources on a mobile device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that performs policy management on a mobile device 102. The mobile device 102 includes at least one processor 104 and computer-readable storage 106. The processor 104 is configured to execute instructions loaded into the storage 106 (e.g., one or more systems loaded into the storage 106, one or more components loaded into the storage 106, etc.). As described in greater detail herein, the storage 106 includes a device policy manager system 108. Accordingly, the device policy manager system 108 is executable by the processor 104. The device policy manager system 108 is configured to handle policy configuration requests for policies from multiple policy sources in a centralized manner on the mobile device 102.

The mobile device 102 can be substantially any type of mobile device. Examples of the mobile device 102 include, but are not limited to, a mobile telephone (e.g., a smartphone), a laptop computing device, a netbook computing device, a tablet computing device, a wearable computing device, a handheld computing device, a portable gaming device, a personal digital assistant, and automotive computer, and so forth. According to other examples, the mobile device 102 can be a desktop computing device, a gaming console, an entertainment appliance, a set-top box, or the like.

The system 100 includes multiple policy sources that can provide policy configuration requests to the device policy manager system 108 of the mobile device 102 to set policy values for policies that control the mobile device 102. The multiple policy sources can include one or more internal policy source component(s) 110 that are executable by the processor 104 of the mobile device 102. Additionally or alternatively, the multiple policy sources can include one or more device management servers external to the mobile device 102.

The internal policy source component(s) 110 can include an application executed by the processor 104 of the mobile device 102, a device user interface of the mobile device 102, and so forth. For instance, an application executed by the processor 104 of the mobile device 102 can set policies based on event(s); the application can configure policies internally to the mobile device 102 based on one or more triggers, such as profile change(s), out of box experience (OOBE) condition(s), and so forth. According to an example, the internal policy source component(s) 110 can include a first party application that can generate a policy configuration request based on an event, where the policy configuration request can be handled by the device policy manager system 108. The first party application can be a base component of the mobile device 102 or a peripheral coupled with the mobile device 102, which is not restricted by or tied into any of the device management servers 112-114.

As shown in the example of FIG. 1, the system 100 includes a device management server 1 112, . . . , and a device management server N 114, where N is substantially any integer (the device management server 1 112, . . . , and the device management server N 114 are collectively referred to herein as device management servers 112-114). However, according to other examples, it is contemplated that the system 100 can include fewer than N device management servers 112-114 (e.g., the mobile device 102 may not be enrolled with any device management server, the mobile device 102 may be enrolled with one device management server). The device management servers 112-114 can include mobile operator management server(s), enterprise device management server(s), or a combination thereof. Examples of an enterprise device management server include a messaging server, a mobile device management (MDM) server, a document server, and so forth. A MDM server can administer the mobile device 102; the MDM server can control and protect data and configuration settings on the mobile device 102 using over-the-air distribution of applications, data, and policy configuration requests. Further, a messaging server can exchange data pertaining to email, calendar, contacts, notes, tasks, and so forth with the mobile device 102 (e.g., the mobile device 102 can securely synchronize email, calendar, contacts, notes, tasks, etc. with the messaging server); thus, the messaging server can send policy configuration request(s) to the mobile device 102 when the mobile device 102 is enrolled with the messaging server. A document server can have a policy application system (e.g., supporting information rights management) that applies policies for access to documents.

The device policy manager system 108 centrally manages the policy configuration requests from the various policy sources on the mobile device 102. It is contemplated that the device policy manager system 108 can centrally manage policy values for policies maintained in policy stores delegated to other component(s) present or in hardware on the mobile device 102. For instance, some policies may be managed and attested in hardware of the mobile device 102. The device policy manager system 108 can be split into two components that delegate tasks to each other, for example. According to yet another example, the device policy manager system 108 can include an orchestrator component that can delegate to a hardware policy manager and a component of the device policy manager system 108.

The device policy manager system 108 handles policy configuration requests pertaining to substantially any policy from substantially any policy source. The device policy manager system 108 can be consistent, secure, concise and extensible. Moreover, the device policy manager system 108 can be lightweight and flexible, allowing policy sources to set policy values for policies of the mobile device 102.

The device policy manager system 108 can accept policy configuration requests from multiple policy sources that can be internal to the mobile device 102 (e.g. the internal policy source component(s) 110) as well as external to the mobile device 102 (e.g., the device management servers 112-114). Further, the policy sources can retrieve current policy values of policies from the device policy manager system 108. A current policy value of a policy is a policy value that is enforced on the mobile device 102 to control the mobile device 102.

The computer-readable storage 106 of the mobile device 102 can also include internal system(s) 116. The internal system(s) 116 can be executable by the processor 104 of the mobile device 102. The internal systems 116 can similarly retrieve current policy values of the policies from the device policy manager system 108. Additionally or alternatively, the device policy manager system 108 can send a notification to one or more of the internal system(s) 116 in response to a change in a current policy value of a policy.

The device policy manager system 108 includes a unified interface component 118 configured to receive policy configuration requests from multiple policy sources. The multiple policy sources can include at least one internal policy source component (e.g., the internal policy source component(s) 110) executed by the processor 104 of the mobile device 102 and at least one of device management server (e.g., the device management servers 112-114) external to the mobile device 102. The unified interface component 118 can be an interface for the policy sources to set and get policy values. Thus, the internal and external policy sources can configure policy values of the mobile device 102 via the unified interface component 118. Moreover, the unified interface component 118 can be an interface to allow the internal systems 116 to retrieve a current policy values that are enforced by the mobile device 102. The unified interface component 118 enables the device policy manager system 108 to interoperate with substantially any type of policy source when reading/writing policy values for the mobile device 102.

The device policy manager system 108 further includes a policy handler component 120 configured to set current policy values for policies that control the mobile device 102. The policy handler component 120 can further retrieve current policy values for the policies (e.g., responsive to requests from the policy sources and/or the internal systems 116, to send notifications to the internal system(s) 116, etc.). Moreover, the policy handler component 120 can reevaluate a current policy value for a policy responsive to the mobile device 102 un-enrolling from a particular policy source or the particular policy source deleting a policy value for the policy set by the particular policy source. The policy handler component 120 can perform a policy evaluation process to compute the current policy values for the policies; such policy evaluation process can be extensible to enable additional policies to be supported by the device policy manager system 108 and secure such that one policy source is unable to view or modify policy configuration requests of other policy sources.

The device policy manager system 108 can have a modularized policy configuration architecture, which can enable plug-in of additional policies. The device policy manager system 108 can be extensible without needing to update the operating system of the mobile device 102. Further, the device policy manager system 108 can enable an impact of management authority of a policy source on a policy to be erased when the policy source is no longer managing the mobile device 102.

The policy handler component 120 can resolve conflicts between conflicting policy values specified by different policy sources. For example, the policy handler component 120 can utilize various conflict resolution techniques to resolve conflicts for the policies. It is to be appreciated that a conflict resolution technique can be set for two or more policies. Additionally or alternatively, differing conflict resolution techniques can be set for differing policies.

Trust need not be established between policy sources on the mobile device 102, which can simply enrollment of the mobile device 102 with policy source(s). The policy handler component 120, for instance, can be configured to resolve conflicts between policy values for a policy from policy sources without trust between such policy sources being established on the mobile device 102 (e.g., a conflict between a first policy value specified by the device management server 1 112 and a second policy value specified by the device management server N 114 can be resolved by the policy handler component 120 without trust between the device management server 1 112 and the device management server N 114 being established on the mobile device 102).

Exemplary conflict resolution techniques that can be utilized by the policy handler component 120 include an exclusive rule (e.g., when a particular value of a policy is applied then a particular value of another policy is not to be applied), an inclusive rule (e.g., set policy to value Foo only if another policy value falls into a range of bar), set policy value to Foo only if a specific condition of the mobile device 102 is X, enforce a policy value per request from a particular policy source, and so forth. Other exemplary conflict resolution techniques include setting a current value of a policy to a most recently written policy value or setting a current value of a policy to a most restrictive policy value.

According to another example, a conflict resolution technique can specify respective authority levels for policy source types. Following this example, the policy handler component 120 can be configured to use such conflict resolution technique to set a current policy value for a policy based on respective authority levels of policy sources from which policy configuration requests are received, where these policy configuration requests include respective policy values for the policy. By way of illustration, a first policy configuration request (including a first policy value for the policy) can be from a first policy source having a first authority level, and a second policy configuration request (including a second policy value for the policy) can be from a second policy source having a second authority level. Pursuant to this illustration, the policy handler component 120 can resolve the conflict between the first policy value and the second policy value using the conflict resolution technique based on the first authority level and the second authority level (e.g., a policy value from a policy source having the first authority level can be selected over a policy value from a policy source having the second authority level). For instance, a conflict resolution technique may specify selecting a policy value from a mobile operator management server over a policy value from a messaging server for a particular policy, while the conflict resolution technique may specify selecting a policy value from a messaging server over a policy value from a mobile operator management server for a differing policy.

It is contemplated that a conflict resolution technique can set authority levels per-source (e.g., based on source identifier (ID)) or per-type of source (e.g., differing authority levels can be set for messaging servers versus MDM servers versus mobile operator management servers versus the internal policy source component(s) 110). Moreover, the authority levels can be defined per-policy or for groups of policies. Pursuant to an example, the conflict resolution technique can specify respective authority levels for policy source types for a group of policies, and differing respective authority levels for the policy source types for a differing group of policies. According to an illustration, a class definition of authority level can be supported. A same authority level can be considered a class, and how a class conflicts with another class can be defined. For example, a given class can include one or more policy sources, and conflict resolution between the classes can be determined by rules that are part of a particular conflict resolution technique.

According to another example, a conflict resolution technique can specify a prohibition of policy sources having a particular authority level from setting a current policy value of the policy. Following this example, it is contemplated that a policy configuration request can be signed by a trusted policy source of the mobile device 102 to override the prohibition. By way of illustration, a policy configuration request from an enterprise device management server (e.g., one of the device management servers 112-114, a messaging server, a MDM server, etc.) can be a signed policy configuration request; the signed policy configuration request can be signed by a trusted policy source of the mobile device 102 (e.g., a source of an operating system executed by the processor 104 of the mobile device 102). Upon receipt of the signed policy configuration request from the unified interface component 118, the policy handler component 120 can be configured to override the prohibition specified by the conflict resolution technique based on the signed policy configuration request. Signing a policy configuration request can ensure that a policy value sent from a policy source cannot be maliciously modified since, if modified, an expected hash or signature would no longer match.

The device policy manager system 108 further includes a policy manager metabase store 122. The policy manager metabase store 122 stores current policy values for policies that control the mobile device 102. The current policy values can result from the policy evaluation process implemented by the policy handler component 120, which merges default policy values and policy values specified by the policy sources (e.g., as part of the policy configuration requests received by the unified interface component 118). The default policy values can be preset in the policy manager metabase store 122. Further, according to an example, it is contemplated that a trusted policy source can remotely modify a default policy value of a policy.

The policy manager metabase store 122 can also store conflict resolution techniques (e.g., handling rules, etc.) and supported data types for each policy, including but not limited to, which values can be set if different policy values are requested by differing policy sources. The policy manager metabase store 122 can allow for per-policy specific handling with customizable rules integrated with device condition(s) (e.g., condition(s) of the mobile device 102), policy source condition(s) (e.g., condition(s) of one or more of the policy sources), and other policy condition(s) (e.g., current policy values of disparate policies). Accordingly, the policy manager metabase store 122 can enable flexible control over the policies enforced by the device policy manager system 108.

Moreover, the policy manager metabase store 122 can perform policy value transfiguration. For example, an old policy may specify "1=disabled, 0=enabled." However, a new model may provide "0=disabled, 1=enabled." Thus, to provide backwards compatibility, the policy manager metabase store 122 can reconfigure the policy values of the old policy.

Each policy can have a default value maintained in the policy manager metabase store 122; default values of policies can be retained in a default policy store of the policy manager metabase store 122. Further, a current policy value of a policy can be determined based on metadata in the default policy store of the policy manager metabase store 122.

The policy manager metabase store 122 can also include respective source policy stores for the multiple policy sources with which the mobile device 102 is enrolled. The policy manager metabase store 122 can store policy values set by the policy sources in the respective source policy stores (e.g., policy values specified in policy configuration requests from the device management server 1 112 can be stored in a source policy store corresponding to the device management server 1 112, policy values specified in policy configuration requests from the device management server N 114 can be stored in a source policy store corresponding to the device management server N 114, etc.). The policy manager metabase store 122 can also store current policy values enforced at the mobile device 102 in a current policy store.

Each policy source can be associated with a unique source identifier (ID) (e.g., which can be handled internally by the device policy manager system 108). The source ID can be set by a calling process and can be used to store source-specific created resources and changed policy values in the policy manager metabase store 122. Moreover, the unified interface component 118 can read/write source-specific policy values and read current policy values of policies maintained in the policy manager metabase store 122 based on the source IDs.

As described herein, the unified interface component 118 is configured to receive policy configuration requests from multiple policy sources. According to an exemplary scenario, the policy configuration requests can include at least a first policy configuration request from a first policy source and a second policy configuration request from a second policy source. Following this exemplary scenario, it is to be appreciated that the policy configuration requests can further include substantially any number of additional policy configuration requests. The first policy configuration request can include a first policy value for a policy. Moreover, the second policy configuration request can include a second policy value for the policy. The first policy source differs from the second policy source, and the first policy value conflicts with the second policy value. The policy handler component 120 is configured to resolve the conflict between the first policy value and the second policy value for the policy. Moreover, the policy handler component 120 is configured to resolve the conflict based on a conflict resolution technique to set a current policy value for the policy that controls the mobile device 102.

The first policy configuration request can further include an identifier of the first policy source (e.g., source ID of the first policy source) and an indicator that specifies the policy for which the first policy value is specified. Moreover, the second policy configuration request can further include an identifier of the second policy source (e.g., source ID of the second policy source) and an indicator that specifies the policy. Moreover, the identifier of the first policy source differs from the identifier of the second policy source (e.g., which can be determined by the unified interface component 118).

The policy handler component 120 is configured to receive the first policy configuration request and the second policy configuration request from the unified interface component 118. The policy handler component 120 can write the first policy value for the policy to a first source policy store of the policy manager metabase store 122, where the first source policy store corresponds to the first policy source. The policy handler component 120 can further write the second policy value for the policy to a second source policy store of the policy manager metabase store 122, where the second source policy store corresponds to the second policy source. The policy handler component 120 further can determine the current policy value for the policy using the conflict resolution technique based at least on the first policy value from the first source policy store and the second policy value from the second source policy store. Moreover, it is to be appreciated that other policy value(s) written to other source policy store(s) of the policy manager metabase store 122 responsive to other policy configuration request(s) from other policy source(s) can likewise be used to determine the current policy value and/or a default policy value in a default policy store of the policy manager metabase store 122 can be used to determine the current policy value. Additionally, the policy handler component 120 can be configured to write the current policy value for the policy as determined to the default policy store of the policy manager metabase store 122.

Figure 2:
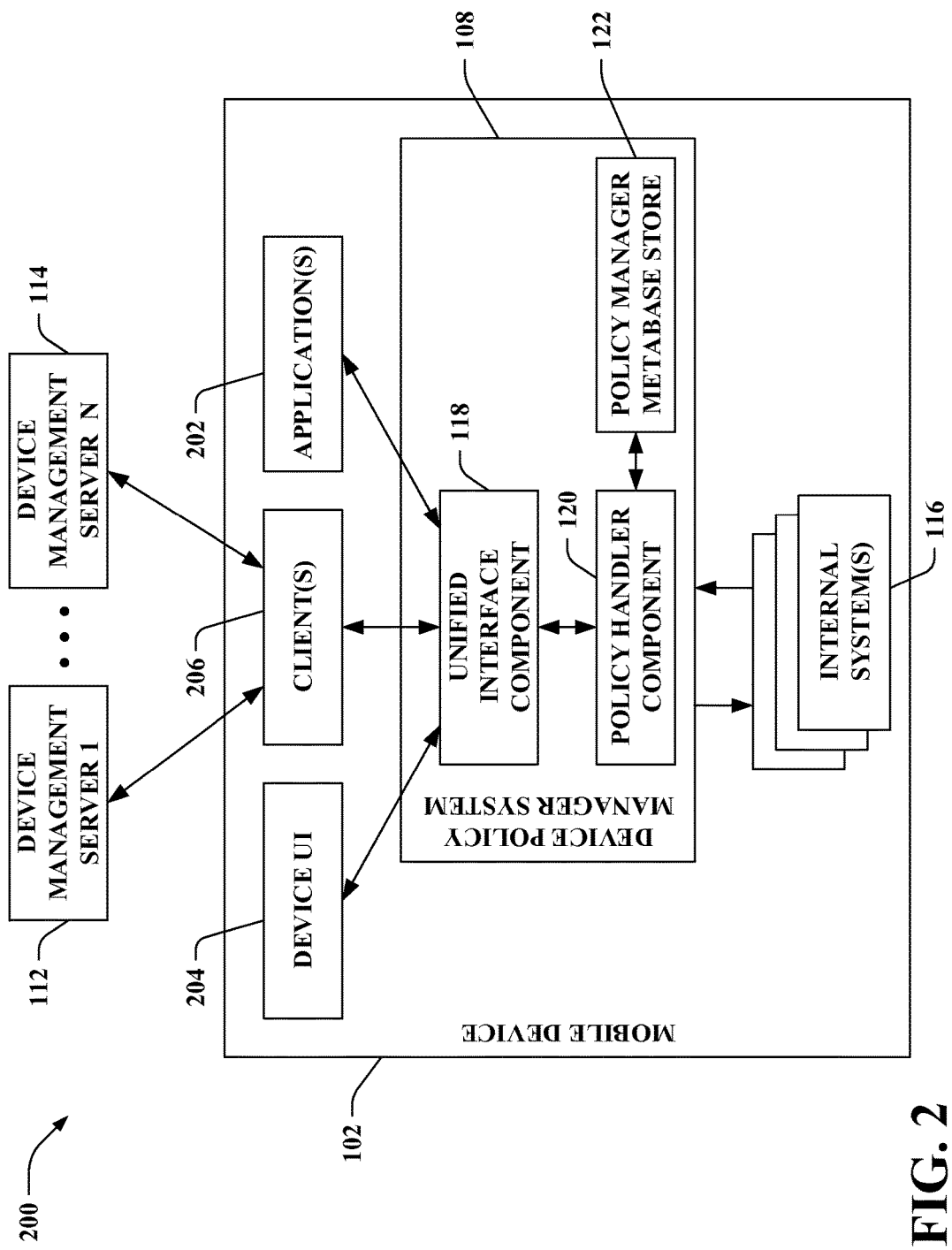
FIG. 2 illustrates a functional block diagram of another exemplary system that performs policy management on the mobile device.

With reference to FIG. 2, illustrated is another system 200 that performs policy management on the mobile device 102. The mobile device 102 includes the device policy manager system 108, the internal system(s) 116, and internal policy source component(s) (e.g., the internal policy source component(s) 110). More particularly, the internal policy source component(s) of the mobile device 102 shown in the example of FIG. 2 include one or more application(s) 202 executed by the processor of the mobile device 102 and a device user interface (UI) 204.

A user of the mobile device 102 can interact with the mobile device 102 via the device user interface 204. For example, the device user interface 204 can provide a control panel that can be interacted with by the user. Accordingly, the device user interface 204 can receive policy configuration requests for policy values for policies from the user of the mobile device 102. Policy configuration requests received via the device user interface 204 can be handled by the device policy manager system 108. Such requests can be received by the unified interface component 118 and further processed by the policy handler component 120 as described herein.

Moreover, the mobile device 102 can include client(s) 206 that interact with the device management servers 112-114. For instance, each of the device management servers 112-114 can have a corresponding client (e.g., one of the client(s) 206) on the mobile device 102.

The internal system(s) 116 of the mobile device 102 can include first and/or second party processes of the mobile device 102. The internal system(s) 116 can receive current policy values from the device policy manager system 108. The internal system(s) 116 can own and/or enforce the policies of the mobile device 102. For instance, the internal system(s) 116 can read the current policy values maintained in the policy manager metabase store 122 of the device policy manager system 108. Additionally or alternatively, the device policy manager system 108 (e.g., the unified interface component 118) can send notifications to the internal system(s) 116; the unified interface component 118 can allow policy controlled resources (e.g., the internal system(s) 116) to register to get policy update notifications. Thus, the device policy manager system 108 (e.g., the unified interface component 118) can send notifications to the internal system(s) 116 responsive to policy value modifications.

The policy handler component 120 can read current policy values of policies maintained in the policy manager metabase store 122. The policy handler component 120 can include policy store modules to read/write policy values to corresponding policy stores in the policy manager metabase store 122. Respective policy stores, for instance, can retain default policy values with metadata, device UI or application policy values, device management server policy values, and current policy values. The policy handler component 120 can perform a policy evaluation after a policy value write based on metadata associated with a policy in the default policy store of the policy manager metabase store 122. The metadata, for example, can specify a conflict resolution technique to be used by the policy handler component 120 for the policy.

The device policy manager system 108 can manage policies that are set from one or more policy sources. The policy values that are used on the mobile device 102 can be a result of a policy evaluation process performed by the policy handler components 120 that considers policy values from each of the device management servers 112-114 with which the mobile device 102 is enrolled as well as the internal policy source component(s). The policy handler component 120 can select corresponding current policy values for the policies using conflict resolution techniques. It is contemplated that a modification to a policy value of a policy can trigger the policy evaluation process by the policy handler component 120. Different policy values of a policy can be written by different policy sources; the policy handler component 120 can ensure a predictable choice of one of the policy values using the conflict resolution technique corresponding to the policy.

A policy source setting or deleting a policy value in a corresponding source policy store of the policy manager metabase store 122, or un-enrollment of a device management server causing removal of its policy values from the corresponding source policy store, can trigger the policy evaluation process by the policy handler component 120. According to an example, the one or more policy sources can include the one or more device management servers 112-114 enrolled with the mobile device 102. When a device management server (e.g., one of the device management servers 112-114) is unenrolled from the mobile device 102, the policy values on the mobile device 102 that were set by the such device management server are reverted, falling back to policy values set by different device management server(s), policy values set by different policy source(s) (e.g., the application(s) 202, by the user via the device user interface 204, etc.), or default policy values. Thus, responsive to un-enrollment of the device management server, policy values written by such device management server are removed, and policy values in the default policy store and remaining source policy stores are re-examined by the policy handler component 120 to update the current policy values in the current policy store. However, for some policy sources, policy values written by such sources may not be removed.

Policies control the behavior of the mobile device 102 and can be set by one or more device management servers 112-114, the device user interface 204 and/or the applications 202 through the unified interface component 118. Policy values are stored in three types of locations in the policy manager metabase store 122: a default policy store that includes default policy values for policies, source policy stores (e.g., each device management server 112-114 can have its own source policy store, each internal policy source component can have its own source policy store) that respectively include policy values for policies written by the corresponding policy sources, and a current policy store that includes current policy values of policies (e.g., resulting from merging policy values from the default and source policy stores).

Pursuant to an example, the policy handler component 120 can be configured to verify a policy value for a policy from a particular policy source before allowing the policy value to be set in a source policy store of the particular policy source. Additionally or alternatively, the policy handler component 120 can be configured to perform a compliance check prior to setting a policy value for a policy from a source policy store as a current policy value for the policy in the current policy store.

According to various examples, the internal system(s) 116 can be unable to modify a policy value. However, pursuant to other examples, the internal system(s) 116 may be able to modify a policy value. Pursuant to an illustration, if the internal system(s) 116 are allowed to modify policy values, then the policy manager metabase store 122 can include source policy stores to record policy values from the internal system(s) 116. Thus, when a policy is evaluated, the source policy stores of the internal system(s) 116 can be accessed by the policy handler component 120 in a similar manner as compared to the source policy stores of the other policy sources.

The device policy manager system 108 allows internal policy source component(s) (e.g., first party components) of the mobile device 102 to set policy values on the mobile device 102 in a manner similar to external device management servers 112-114 as well as be integrated with such external policy sources. An example of such an internal policy source component is an anti-leak lock component. For instance, upon boot up of the mobile device 102, the anti-leak lock component can create its own configuration profile to lock the mobile device 102, setting policy values in a source policy store corresponding to the anti-leak lock component. Thus, security on the mobile device 102 can be enhanced by using the anti-leak lock component in connection with the device policy manager system 108.

The device policy manager system 108 is not tied to a particular device management server (e.g., one of the device management servers 112-114); instead, the device policy manager system 108 can interact across differing types of external servers (e.g., the device management servers 112-114). The device policy manager system 108 is lightweight and flexible and does not require an external server (e.g., the device policy manager system 108 is policy source-agnostic).

Further, the policy manager metabase store 122 can persistently store user-entered policy values (e.g., received via the device user 204). By way of illustration, the policy manager metabase store 122 may retain a value for a policy that conflicts with a value set by differing policy source (e.g., one of the device management servers 112-114 and/or the application(s) 202). While the differing policy source continues to enroll the mobile device 102, the user-entered value can be ignored (e.g., such user-entered value can be considered invalid yet can continue to be retained in a corresponding source policy store). However, upon un-enrollment of the differing policy source with the conflicting value for the policy, then the user-entered value can be accessible and potentially used as the current policy value as determined by the policy handler component 120 through the policy evaluation process (e.g., the user-entered value may later be valid).

Figure 3:
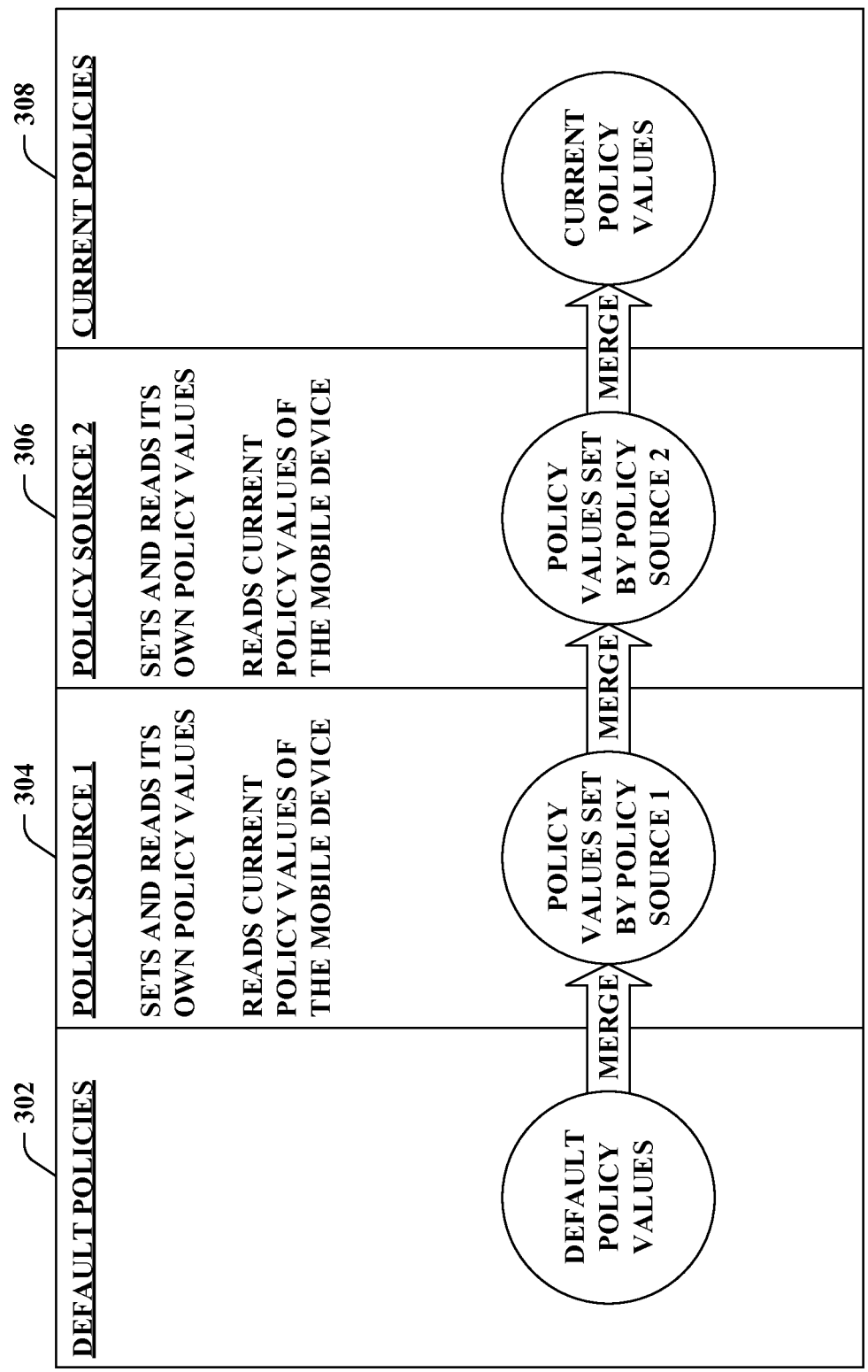
FIG. 3 illustrates an exemplary diagram depicting a policy evaluation process performed by a policy handler component.

Turning to FIG. 3, illustrated is an exemplary diagram depicting a policy evaluation process performed by the policy handler component 120. While FIG. 3 describes two policy sources that set respective policy values (e.g., a policy source 1 and a policy source 2), it is contemplated that substantially any other policy sources can set policy values as described herein.

At 302, default policy values preset on the mobile device 102 are shown. The default policy values can be stored in a default policy store of the policy manager metabase store 122. The default policy values can be stored along with metadata describing conflict resolution techniques used to select current policy values for the policies. A default policy value for a policy can be returned (e.g., to a caller) if no other policy source sets a policy value for such policy. For example, the default policy value for a policy can be stored as a current policy value in the current policy store when no other policy source sets a policy value for the policy. According to another example, a default policy value for a policy can be returned from the default policy store when no other policy source sets a policy value for the policy.

At 304, a first policy source can write and read its own policy values and can read current policy values of the mobile device 102. During a management session, the first policy source can change policy values in its own source policy store through the device policy manager system 108, which can result in the policy evaluation process involving other source policies and the default policies (e.g., via a merge). The resulting current policy values can be retained in the current policy store. Further, if a policy value changed from its previous value in the current policy store, then a notification can be sent (e.g., to one or more of the internal system(s) 116). Further, policy values written to the source policy store of the first policy source cannot be modified or deleted by other policy sources or the mobile device 102.

At 306, a second policy source can write and read its own policy values and can read the current policy values of the mobile device 102. Similar to above, during a management session, the second policy source can change policy values in its own source policy store, which can result in the policy evaluation process being performed. Moreover, policy values written to the source policy store of the second policy source cannot be modified or deleted by other policy sources or the mobile device 102.

At 308, current policies are stored in the current policy store. Moreover, during un-enrollments of a policy source, policy values set by such policy source are removed from the corresponding source policy store of the policy source and the policy evaluation process is re-applied.

Figure 4:
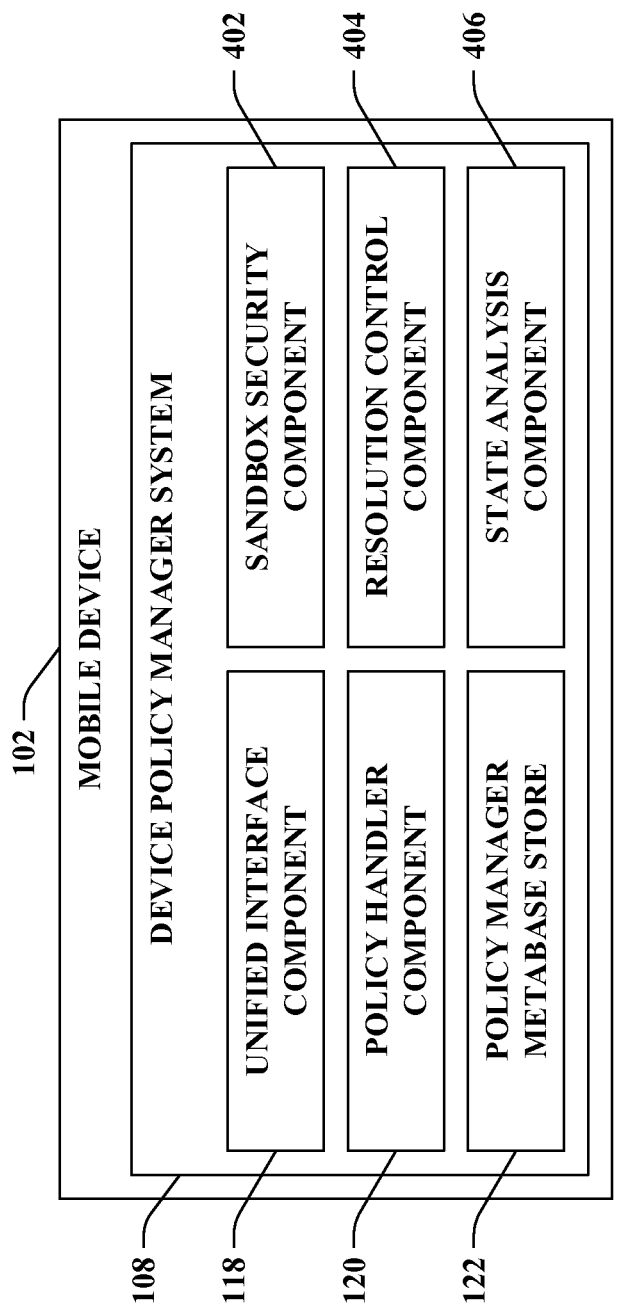
FIG. 4 illustrates a functional block diagram of a device policy manager system of a mobile device in greater detail.

FIG. 4 illustrates the device policy manager system 108 of the mobile device 102 in greater detail. The device policy manager system 108 includes the unified interface component 118, the policy handler component 120, and the policy manager metabase store 122.

Reference is again made to the exemplary scenario noted above where the policy configuration requests received by the unified interface component 118 include at least a first policy configuration request from a first policy source and a second policy configuration request from a second policy source. Again, the first policy configuration request can include a first policy value for a policy, and the second policy configuration request can include a second policy value for the policy. The first policy source differs from the second policy source, and the first policy value conflicts with the second policy value.

According to various examples, the device policy manager system 108 can include a sandbox security component 402 configured to disallow a policy source from viewing or modifying a policy configuration request of another policy source. The above-noted exemplary scenario is again referenced. The sandbox security component 402 can be configured to permit the first policy source to access a first source policy store of the policy manager metabase store 122 for the first policy source. The sandbox security component 402 further can be configured to permit the second policy source to access a second source policy store of the policy manager metabase store 122 for the second policy source. Moreover, the sandbox security component 402 can be configured to restrict the first policy source from access to the second source policy store and configured to restrict the second policy source from access to the first source policy store.

The device policy manager system 108 can further include a resolution control component 404. The resolution control component 404 can be configured to control the conflict resolution techniques used by the policy handler component 120 for the policies (e.g., set the metadata associated with the policies in the default policy store). According to an example, the resolution control component 404 can be configured to control the conflict resolution technique used by the policy handler component 120 for a policy based on a conflict resolution handling setting received from a particular policy source and an authority level of the particular policy source (e.g., the conflict resolution handling setting can be received by the unified interface component 118). The policy handler component 120 can resolve a conflict between differing policy values for the policy specified in differing policy configuration requests provided by differing policy sources based on the conflict resolution technique for the policy controlled by the resolution control component 404.

For instance, the resolution control component 404 can be configured to arbitrate between conflict resolution handling settings received from two or more of the multiple policies sources (e.g., from which the unified interface component 118 receives policy configuration requests, with which the mobile device 102 is enrolled) based on respective authority levels of the two or more of the multiple policy sources. Such arbitration can enable the resolution control component 404 to choose a selected conflict resolution handling setting for the policy. Moreover, the resolution control component 404 can be configured to control the conflict resolution technique used by the policy handler component 120 for the policy based on the selected conflict resolution handling setting (e.g., the policy evaluation can be performed by the policy handler component 120 for the policy using the selected conflict resolution technique set based on the selected conflict resolution handling setting).

By way of illustration, a mobile operator management server can set the conflict resolution technique used by the policy handler component 120 for a policy by sending a first conflict resolution handling setting to the mobile device 102; the resolution control component 404 can receive and set the conflict resolution technique based upon the first conflict resolution handling setting. Thereafter, an enterprise device management server (having a greater authority level than the mobile operator management server for the policy) can change the conflict resolution technique used by the policy handler component 120 by sending a second conflict resolution handling setting to the mobile device. Thus, the resolution control component 404 can receive and change the conflict resolution technique for the policy based on the second conflict resolution handling setting since enterprise device management server has the greater authority level.

According to another example, the resolution control component 404 can be configured to receive a conflict resolution handling setting from a particular policy source. Moreover, the resolution control component 404 can be configured to detect an established trust between the particular policy source and a trusted policy source of the mobile device 102. The trusted policy source may be a source of an operating system of the mobile device 102; yet, the claimed subject matter is not so limited. Moreover, responsive to detection of the established trust, the resolution control component 404 can control the conflict resolution technique used by the policy handler component 120 for the policy based on the conflict resolution handling setting. Following this example, in the absence of the established trust, the particular policy source may be prohibited from controlling the conflict resolution technique used by the policy handler component 120 for the policy based on the authority level of the particular policy source.

The device policy manager system 108 can further include a state analysis component 406 configured to detect whether a given conflict resolution technique used by the policy handler component 120 to resolve a conflict for a policy causes an undesirable state of the mobile device 102. For instance, the state analysis component 406 can detect a non-operable state, non-stable state, or a non-secure state that will result from use of the given conflict resolution technique (e.g., a first policy source setting a text color on a display to black and a second policy source setting a background color on a display to black, a combination of policy values for policies that result in mobile devices being reset above a threshold percentage of occurrences, etc.). The resolution control component 404 can further be configured to control the conflict resolution technique used by the policy handler component 120 for the policy based on whether the given conflict resolution technique causes the undesirable state. For instance, the resolution control component 404 can maintain the given conflict resolution technique as the conflict resolution technique used by the policy handler component 120 based on the state analysis component 406 detecting that the given conflict resolution technique does not cause the undesirable state. Moreover, the resolution control component 404 can be configured to modify the given conflict resolution technique to be a differing conflict resolution technique to be used by the policy handler component 120 based on the state analysis component 406 detecting that the given conflict resolution technique causes the undesirable state. Additionally or alternatively, the state analysis component 406 can further be configured to alert management and/or audit server(s) responsive to detecting that the given conflict resolution techniques causes the undesirable state. Accordingly, the state analysis component 406 can enhance security on the mobile device 102 and lead to the mobile device 102 being more reliable.

The state analysis component 406 can perform validation to detect whether a particular conflict resolution causes an undesirable state. The validation performed by the state analysis component 406 can be based on collected data from a plurality of mobile devices. For instance, trends can be detected from the collected data to determine the undesirable states. Thus, the state analysis component 406 can use information pertaining to the undesirable states when evaluating whether the given conflict resolution technique used by the policy handler component 120 to resolve the conflict for the policy causes the undesirable state of the mobile device 102.

Moreover, the state analysis component 406 can use the collected data to detect whether a malicious source is targeting policy source(s) and maliciously modifying policy source targets that cause insecurity. Additionally or alternatively, malware can similarly be detected using the collected data.

FIGS. 1, 2, and 4 are now generally referenced. Below are various exemplary policies that can be managed by the device policy manager system 108.

Figure 5:
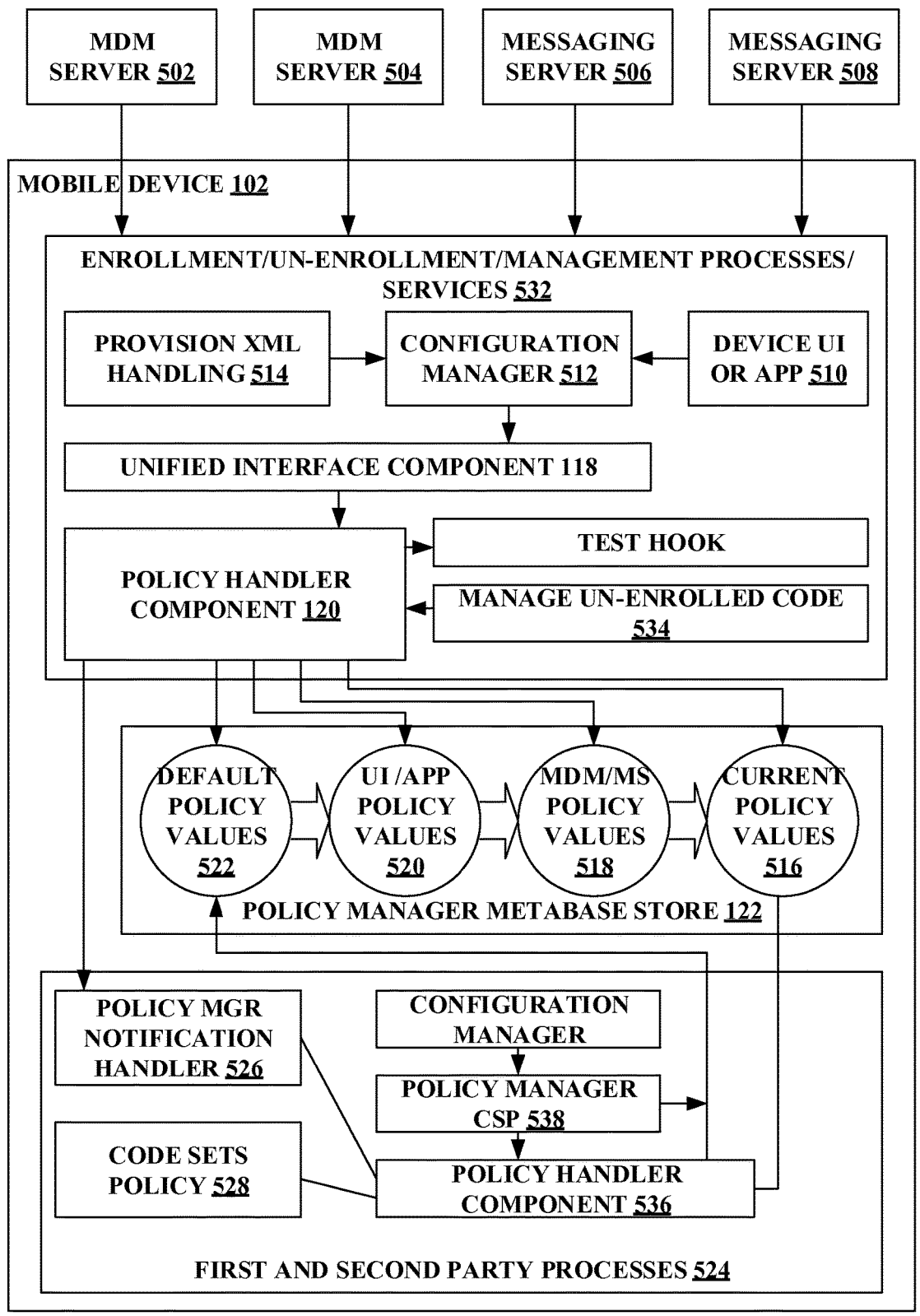
FIG. 5 illustrates an exemplary implementation of a device policy manager system.

Device Lock
   Device Password Enabled
   Allow Simple Device Password
   Minimum Device Password Length
   Alphanumeric Device Password Required
   Device Password Expiration
   Device Password History
   Maximum Number of Allowed Device Password Failed Attempts
   Maximum Inactivity Time Until Device Lock
   Minimum Device Password Complex Characters
WiFi
   Allow WiFi
   Allow Internet Sharing
   Allow WiFi Off-Loading
   Allow WiFi Hot Spot Reporting
   Allow Manual WiFi Configuration
System
   Allow FM Radio
   Allow External Storage Card Allow Location
Allow Telemetry
Connectivity
  Allow Cellular Data
  Allow Cellular Data Roaming
  Allow Manual VPN Configuration
  Allow NFC
  Allow USB Connection
  Allow Bluetooth
Experience
  Allow Synchronization of Settings
  Allow Kids Corner
  Allow Copy Paste
  Allow Screen Capture
  Allow Voice Recording
  Allow Application Notification Above Lock Screen
Accounts
  Allow Account_Type1
  Allow Account_Type2
  Allow Social Networking Service Account
  Allow Microblogging Service Account
  Allow Save Email Attachment
  Allow Manual Email Configuration
Security
  Allow Manual Root Certificate Installation
  Allow Third Party Application Installing Certificate
  Require Device Encryption
Browser
  Allow Proxy
  Allow Cookies
  Allow Uploading of Browsing History
  Allow Suggestions
  Allow Browser
  Enforce Smart Screen Filtering
  Enforce Do Not Tracking
  Allow Browser Access Location
  Allow Changing Extension Association
Update
  Allow Update By User
Camera
  Allow Photo and Video Sharing
  Allow Photo and Video Uploading
  Allow Picture and Video Geotagging
  Allow Camera Use
Application Management
  Allow Games
  Allow Music
  Store Auto Update
  Disallowed Applications FIG. 5 illustrates an exemplary implementation of a device policy manager system. It is to be appreciated that the device policy manager system shown in FIG. 5 is provided as an exemplary implementation, and the claimed subject matter is not limited to the example set forth in FIG. 5. The example set forth in FIG. 5 includes the mobile device 102 as well as MDM server 502, MDM server 504, messaging server 506, and messaging server 508.

MDM server 502, MDM server 504, messaging server 506, and messaging server 508 can have respective pre-established accounts with the device policy manager system. An account can be a string associated with information such as, for example, server name, server address, authentication information, etc. Likewise, internal policy source components can have pre-established accounts. Further, the policy sources can have different capabilities for setting policies depending upon policy source type. For instance, a set of policies that can be controlled by MDM servers 502-504 can differ from a set of policies that can be controlled by messaging servers 506-508, applications, via the device UI, or the like. Moreover, it is contemplated that policies in the respective sets controlled by the differing policy sources can vary based on factors pertaining to the mobile device 102 (e.g., edition or licensing of components or systems in storage of the mobile device 102, a type of the mobile device 102, etc.).

During a session, a policy source (e.g., MDM server 502, MDM server 504, messaging server 506, messaging server 508, device UI or application 510, etc.) can set policies through a configuration manager 512. The policy source can provision XML (Extensible Markup Language) 514, which can be fed into the configuration manager 512. Responsive thereto, the configuration manager 512 can load the unified interface component 118. The unified interface component 118 can be used to read/write policy source-specific policy values and read current policy values. A source ID is set by the calling process used to store policy source-specific created resources and changed policy values. The unified interface component 118 can load a portion of the policy handler component 120 corresponding to a type of the policy source.

The unified interface component 118 can identify a policy source that is attempting to effectuate a policy change. A relevant portion of the policy handler component 120 for the policy source identified by the unified interface component 118 can be loaded, which can be used to read and write policy values to the corresponding policy store of the policy manager metabase store 122.

The policy handler component 120 can read/write policy values to the corresponding source policy store (e.g., hive) in the policy manager metabase store 122. Further, the policy evaluation process can be performed responsive to writing a policy value in the source policy store. The policy handler component 120 can include policy modules to read current policy values from a current policy store 516. Further, the policy handler component 120 can include policy store modules to read/write policy values to appropriate source policy stores 518 and 520 (e.g., corresponding to policy sources). Moreover, a first party policy write module can be supported by the policy handler component 120 to read/write the default policy values and metadata in the default policy store 522. The policy handler component 120 further can perform policy evaluation after a policy value write based on the metadata associated with each policy in the default policy store 522. As an example, the metadata (e.g., conflict resolution technique) may state the policy is to be the most secure policy merge or no merge is needed. By way of illustration, a policy can support a no merge model, where the policy handler component 120 does not merge policy values for the policy; rather, the policy handler component 120 can send a notification that includes an indication of a location of a resulting value, which can be accessible and returned as a current policy value when queried.

It is contemplated that the policies can be separated by area. For instance, in the list of exemplary policies set forth above, examples of areas include Device Lock, WiFi, System, Connectivity, Experience, Accounts, Security, Browser, Update, Camera, and Application Management. The policy handler component 120 can provide a notification to first and second party processes 524 on an area that has a policy that is changed. Moreover, it is to be appreciated that an external policy source can add a new policy; thus, an area to which the new policy belongs can be declared. Thus, the external policy source can classify configuration sources, policy value metadata, etc. for such new policy.

A policy manager notification handler 526 can receive the notification from the policy handler component 120. Further, first party and second party code 528 can cause a policy value to be set. According to an example, an anti-leak lock component can be part of the code 528 that sets a policy value.

To describe the exemplary implementation of the device policy manager system shown in FIG. 5 in greater detail, various exemplary scenarios are set forth below. It is to be appreciated that these scenarios are provided for illustration purposes, and the claimed subject matter is not so limited.

Exemplary Scenario 1: The mobile device 102 has no device management servers managing policies, but a first party component sets/gets a policy.

In this scenario, the mobile device 102 has no device management servers that are managing policy values. This means that there are no MDM servers 502-504 or messaging servers 506-508 that have enrolled the mobile device 102. In this scenario, the first and second party, on-device processes 524 set policy values. For instance, a device manufacturer may have included a component that sets policy value(s) specific to that manufacturer; such policy value(s) can override operating system built-in defaults. Such component may be a program that interacts with the get/set policy, or the operating system itself can include a program that reads and applies manufacturer declared policy values.

When first party components set policies, they can use an exported module from the policy handler component 120 to set a specific policy. The "set" module writes the policy value to the default policy store 522, initiates the policy evaluation process, and saves the current policy value in the current policy store 516. Since only the default policy store 522 has policy values, the policy evaluation process looks at the other source policy stores 518-520 to evaluate against, but since there are no other policy values in such source policy stores 518-520, the current policy values are updated with the policy values from the default policy store 522. The policy values in the default policy store 522 are copied to the current policy store 516.

To read policies, the first party component can use the modules of the policy handler component 120 (e.g., policy handler component 536). A substantially similar policy evaluation described in the "set" occurs with a "get", thus updating the policy value in the current policy store 516. Note that if the current policy store 516 does not have a value stored for the targeted policy, then no notification needs to be fired as a change notification. Effectively, such a policy has not changed. Moreover, the policies have default values in the default policy store 522. Thus, a package (e.g., policy manager configuration server provider (CSP) 538) can define the default values for policies.

Exemplary Scenario 2: The mobile device 102 is enrolled into one or more messaging servers 506-508 and a single MDM server 502. During a management session, the MDM server 502 sets a policy value.

In accordance with this scenario, the mobile device 102 is enrolled into multiple messaging servers 506-508 and the MDM server 502. After enrollment, the MDM server 502 sets a policy through the unified interface component 118 called "Device Password Enabled" to a value of "0", thus causing the user to enter a password. The unified interface component 118 processes each of the nodes, "Device Lock" and "Device Password Enabled", noting "Device Lock" as the area and "Device Password Enabled" as the policy.

The unified interface component 118 can call a policy manager store module of the policy handler component 120 that sets a policy value. The source ID, area, policy name, and value can be inputted to the internal store module. The source ID is the key to the Open Mobile Alliance (OMA) Device Management (DM) account or messaging server account that had been created during enrollment of the mobile device 102 with the MDM server 502. The source ID can be set to a session variable called "OMADM::ServerID" by the OMA-DM session handling or the messaging server session handling and is retrieved by the unified interface component 118 prior to calling the policy manager store module of the policy handler component 120. A source ID value of zero (0) indicates a first or second party component is calling this module, which is not the case in this scenario.

According to an example, the policy manager store module of the policy handler component 120 can perform the following. Such portion of the policy handler component 120 can verify the source ID, if not NULL, is valid by going to the OMA DM accounts, though a OMA DM module to find it. If not found, then a messaging server account can be searched. If the account is not found, then an error is returned to the unified interface component 118 and thus this is returned to the MDM server 502. Note that if the source ID is NULL, then the method is being called by a first party component. Also note messaging server accounts have globally unique identifiers as IDs and these are expected to serve as source IDs.

Moreover, the policy manager store module of the policy handler component 120 can validates the policy value by using the metadata in the default policy store 522 associated with the policy. If an error is returned, then this result is propagated back up to the unified interface component 118 thus terminating the processing. Further, such portion of the policy handler component 120 can write the policy value into the appropriate source policy store of the policy manager metabase store 122.

In accordance with another example, the area and policy name can be input to a policy evaluation module of the policy handler component 120. The policy evaluation module can enumerate through the default policy store 522 and the various source policy stores 518-520 per source ID, the given area, and policy name. Further, a resulting policy directed by the policy metadata stored in the default policy store 522 can be calculated. Ultimately, the intended result policy is derived through the policy evaluation process and the value is set in the current policy store 516. If the derived policy value is different than what was stored in the current policy store 516 previously, then a flag is returned indicating the policy value changed and optionally returned is the changed value (value in the current policy store 516). If the request succeeds, a changed parameter of the policy evaluation module can be checked to determine if a notification is to be sent or not. Further, if any of the steps above fail, then the changes are rolled back and the error value is returned.

The unified interface component 118 notes whether the changed flag is set or not. If this flag is set, the area is added to a collection of "changed areas". This collection is used to send a per area notification after the configuration manager 512 transaction is completed successfully. Registered policy manager notification handlers (e.g., the policy manager notification handler 526), upon receiving the notification, can inspect a payload (e.g., 32 bit) for a bit that is set, which corresponds to a policy under the area. Moreover, the policy manager notification handlers can read the policy value (e.g., using a get module of the policy handler component 120).

Exemplary Scenario 3: The mobile device 102 is un-enrolled from a MDM server (e.g., the MDM server 502) that has set a policy during a previous management session.

Pursuant to this scenario, when the policy source is un-enrolled, the un-enrollment process (532, 534) can retrieve the policies to be removed. For policies, the un-enrollment code 534 can use a find first policy module of the policy handler component 120, which returns the first policy. The policy is then deleted by a delete current policy module of the policy handler component 120, which removes the policy from the source policy store and does a policy evaluation as described in Exemplary Scenario 2. The process can be performed for returned policies obtained using a find next policy module of the policy handler component 120.

Exemplary Scenario 4: The mobile device 102 is enrolled to the MDM server 502, and the MDM server 502 wants to query policies it configured.

According to this scenario, a list of policies and the corresponding values can be returned for a given area, per policy source. For instance, the find first policy module and the find next policy module of the policy handler component 120 can be used, along with a source ID, to internally return polices for the policy source.

Exemplary Scenario 5: The mobile device 102 is enrolled to the MDM server 502, and the MDM server 502 wants to query policies, independent of policy source.

A list of policies and the corresponding values can be returned for an area in a merged policy hive by using queries. According to an example, the find first policy module and the find next policy module of the policy handler component 120 can be used, with a source ID, to internally return polices for the policy source.

Exemplary Scenario 6: The mobile device 102 is enrolled into one or more messaging servers 506-508 and a single MDM server 502, and the messaging servers 506-508 and MDM server 502 try to set a single policy concurrently.

Synchronization techniques can be employed to protect data integrity. Moreover, the policy stores of the policy manager metabase store 122 can have locks.

Exemplary Scenario 7: A mobile operator management server tries to change a policy through the unified interface component 118 during a management session.

The configuration manager 512 can load the unified interface component 118 and then process the node paths. Different policy sources may be granted different levels of access to different policies. For instance, a mobile operating management server may have permission to configure connection related policies but not email related policies, and an attempt of the mobile operator management server to configure email related policies can result in access being denied.

According to various examples, a policy application can be provided. The policy application can be a UI application displaying the policies of the various policy stores. The application allows the changing of policy values (e.g., in policy stores other than the current policy store 516). In accordance with various embodiments, the policy evaluation process can start with the metadata stored with the default policy store 522 describing how the policy evaluation process desirably should proceed.

More generally, according to another exemplary scenario, policies can be managed in a hybrid environment using the device policy manager system. The device policy manager system may run on legacy systems that already having existing device management functionality that cannot change to tie into the device policy manager system. Consider the scenario of the device policy manager system running on a desktop device, where the setting it is configuring may be a registry key modified by multiple agents (applications on device writing registry directly, Active Directory via domain join, etc.). In this case, the device policy manager system, attempting to roll back to an original settings, can be broken since it no longer is the sole authority of the settings.

To address the foregoing in the above-noted exemplary scenario, the device policy manager system can monitor other agents writing the settings. For instance, the device policy manager system can listen for registry change notifications. If a setting it configures is modified by another agent, device policy manager system can do the following (but potentially more)—(a) audit that someone else has changed the value directly so the component can be changed in future; (b) be aware that the setting is "dirty" and that during un-enrollments, the device policy manager system can no longer roll back the setting to its original value; and (c) take additional action for most-secure wins and other calculations with an awareness that there is additional data outside its core "best-wins" database to be factored in.

Figure 6:
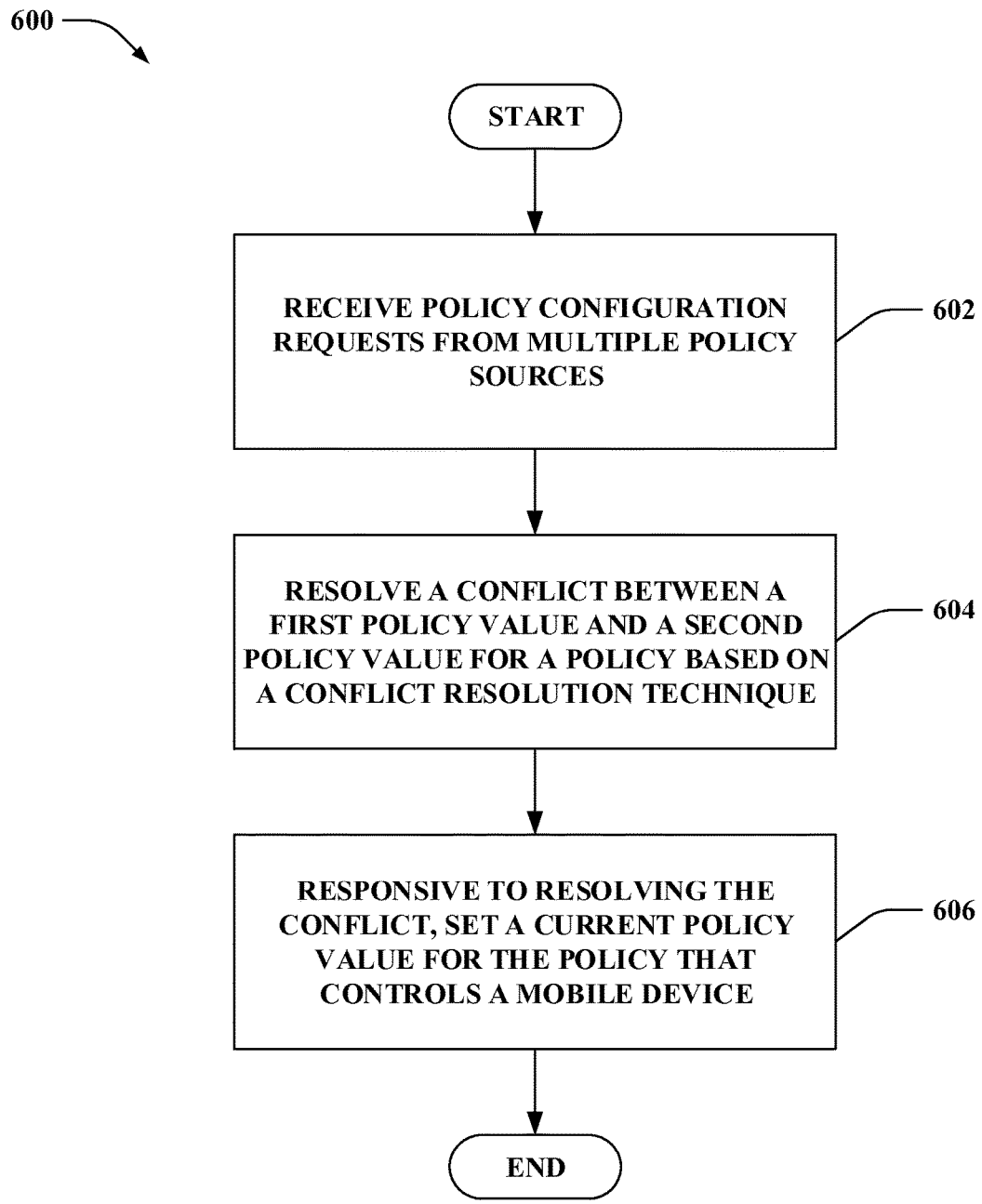
FIG. 6 is a flow diagram that illustrates an exemplary methodology of managing policies on a mobile device.
Figure 7:
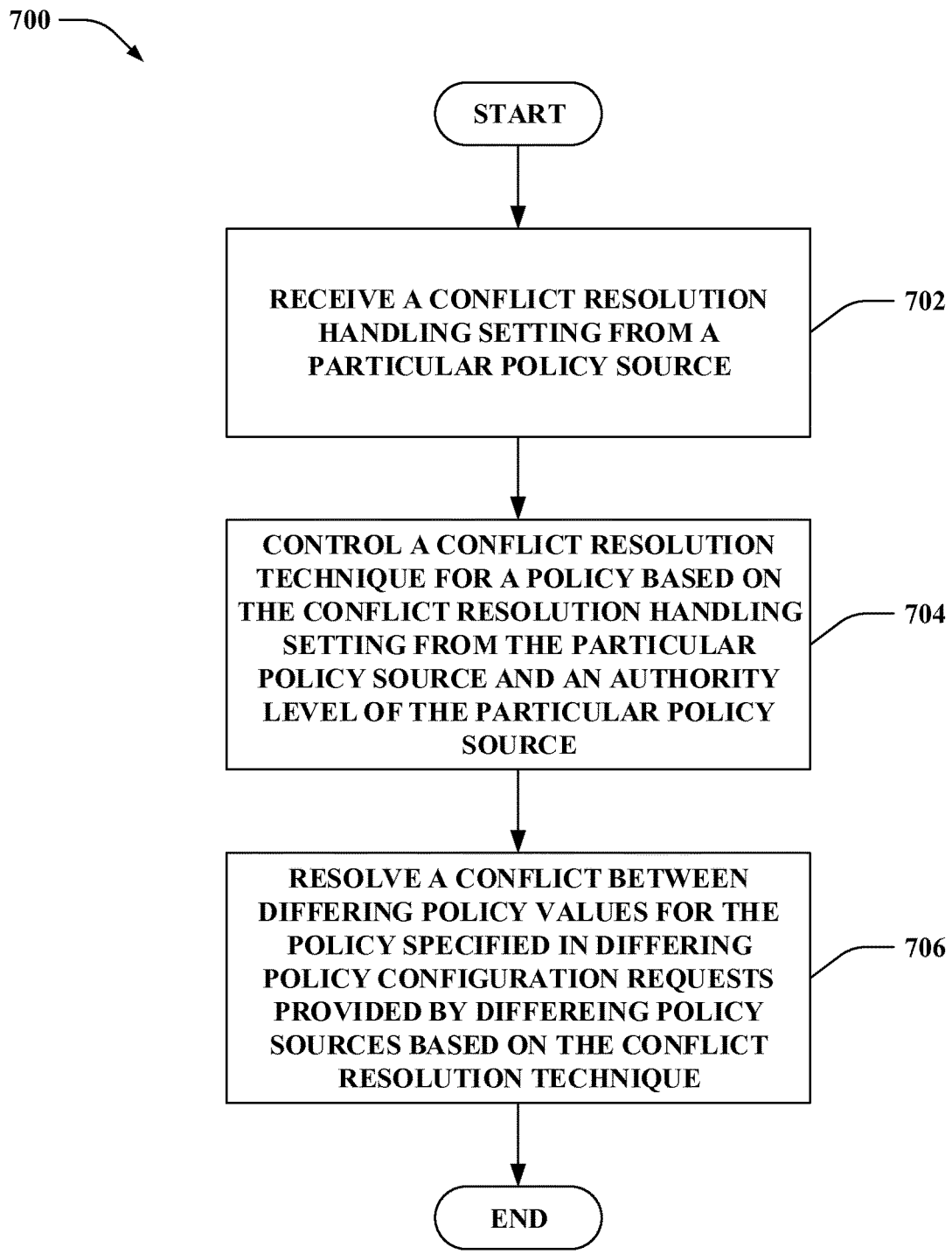
FIG. 7 is a flow diagram that illustrates an exemplary methodology of controlling a conflict resolution technique used to manage policies on a mobile device.

FIGS. 6-7 illustrate exemplary methodologies relating to managing policies on a mobile device. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 6 illustrates a methodology 600 of managing policies on a mobile device. At 602, policy configuration requests from multiple policy sources can be received at the mobile device. The multiple policy sources include at least an internal policy source executed by the mobile device and a device management server external to the mobile device. The policy configuration requests include at least a first policy configuration request from a first policy source and a second policy configuration request from a second policy source. The first policy configuration request includes a first policy value for a policy, and the second policy configuration request comprises a second policy value for the policy. The first policy source differs from the second policy source, and the first policy value conflicts with the second policy value. At 604, the conflict between the first policy value and the second policy value for the policy can be resolved based on a conflict resolution technique. The conflict can be resolved without trust between the first policy source and the second policy source being established on the mobile device. At 606, responsive to resolving the conflict, a current policy value for the policy that controls the mobile device can be set.

Turning to FIG. 7, illustrated is a methodology 700 of controlling a conflict resolution technique used to manage policies on a mobile device. At 702, a conflict resolution handing setting can be received from a particular policy source. At 704, a conflict resolution technique for a policy can be controlled based on the conflict resolution handling setting from the particular policy source and an authority level of the particular policy source. At 706, a conflict between differing policy values for the policy specified in differing policy configuration requests provided by differing policy sources can be resolved based on the conflict resolution technique. A current policy value for the policy that controls the mobile device can be set using the conflict resolution technique.

Figure 8:
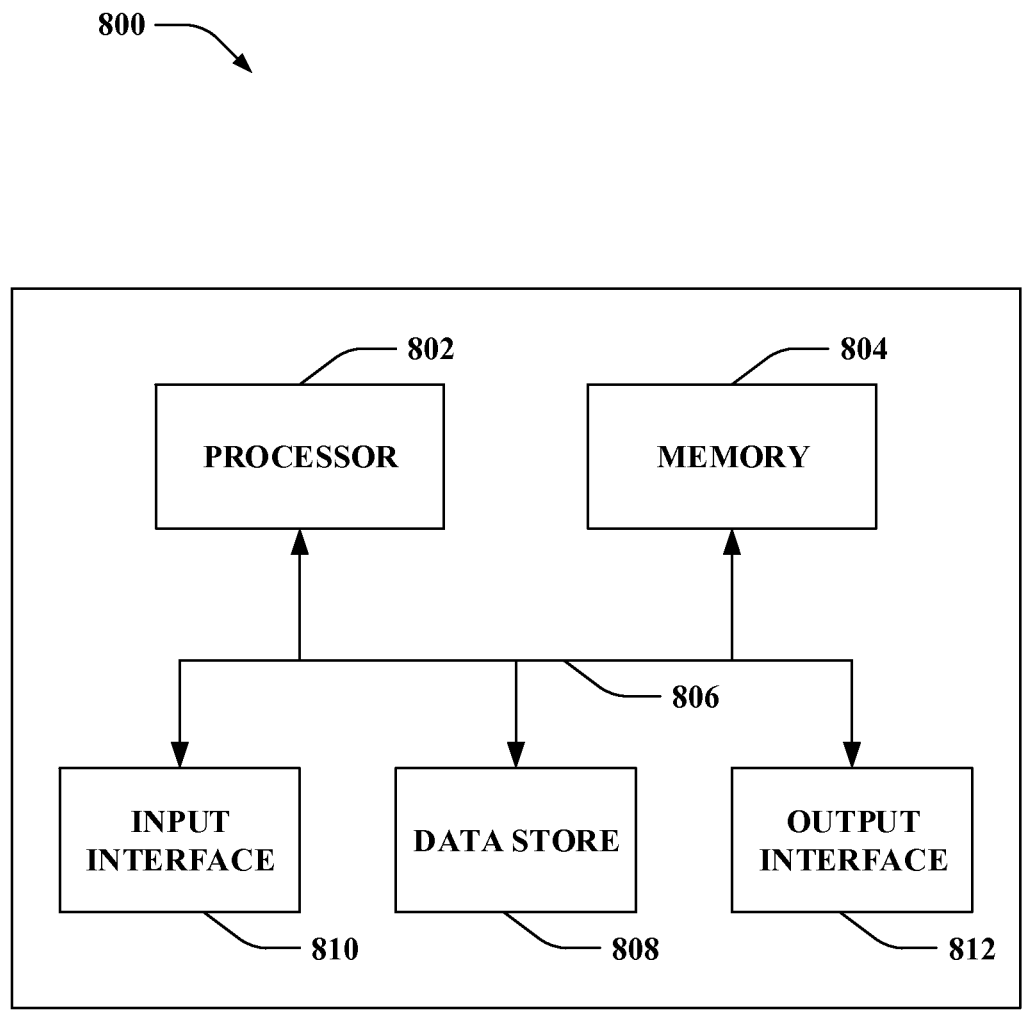
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 may be the mobile device 102. By way of another example, device management servers 112-114 may be or include the computing device 800. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store policy values for policies, metadata for policies (e.g., conflict resolution techniques), conflict resolution handling settings, and so forth.

The computing device 800 additionally includes a data store 808 that is accessible by the processor 802 by way of the system bus 806. The data store 808 may include executable instructions, policy values for policies, metadata for policies (e.g., conflict resolution techniques), conflict resolution handling settings, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various examples are now set forth.

Example 1

A mobile device, comprising: at least one processor; and computer-readable storage comprising a device policy manager system executable by the at least one processor, the device policy manager system comprising: a unified interface component configured to receive policy configuration requests from multiple policy sources, the multiple policy sources comprising at least an internal policy source component configured to be executed by the at least one processor of the mobile device and a device management server external to the mobile device, the policy configuration requests comprising at least: a first policy configuration request from a first policy source, the first policy configuration request comprising a first policy value for a policy; and a second policy configuration request from a second policy source, the second policy configuration request comprising a second policy value for the policy, the first policy source differing from the second policy source, and the first policy value conflicting with the second policy value; and a policy handler component configured to resolve the conflict between the first policy value and the second policy value for the policy based on a conflict resolution technique to set a current policy value for the policy that controls the mobile device.

Example 2

The mobile device according to Example 1, wherein: the first policy configuration request further comprises an identifier of the first policy source and an indicator that specifies the policy; the second policy configuration request further comprises an identifier of the second policy source and the indicator that specifies the policy; and the identifier of the first policy source differs from the identifier of the second policy source.

Example 3

The mobile device according to any of Examples 1-2, the policy handler component being further configured to resolve the conflict between the first policy value and the second policy value for the policy without trust between the first policy source and the second policy source being established on the mobile device.

Example 4

The mobile device according to any of Examples 1-3, the conflict resolution technique specifying respective authority levels for policy source types, and the policy handler component further configured to use the conflict resolution technique to set the current policy value for the policy based on a first authority level of the first policy source and a second authority level of the second policy source.

Example 5

The mobile device according to Example 4, the conflict resolution technique specifying the respective authority levels for the policy source types for a group of policies, the group of policies comprising the policy, and the conflict resolution technique specifying differing respective authority levels for the policy source types for a differing group of policies that lacks the policy.

Example 6

The mobile device according to any of Examples 1-5, the first policy source being an enterprise device management server having a given authority level, the conflict resolution technique specifying a prohibition of policy sources having the given authority level from setting the current policy value of the policy, the first policy configuration request being a signed policy configuration request signed by a trusted policy source of the mobile device, and the policy handler component further configured to override the prohibition specified by the confliction resolution technique based on the signed policy configuration request.

Example 7

The mobile device according to any of Examples 1-6, the computer-readable storage further comprising a policy manager metabase store; and the policy handler component further configured to: receive the first policy configuration request and the second policy configuration request from the unified interface component; write the first policy value for the policy to a first source policy store of the policy manager metabase store, the first source policy store corresponding to the first policy source; write the second policy value for the policy to a second source policy store of the policy manager metabase store, the second source policy store corresponding to the second policy source; determine the current policy value for the policy using the conflict resolution technique based at least on the first policy value from the first source policy store and the second policy value from the second source policy store; and write the current policy value for the policy to a current policy store of the policy manager metabase store.

Example 8

The mobile device according to any of Examples 1-7, the computer-readable storage further comprising a policy manager metabase store, the policy manager metabase store comprising respective policy stores for the multiple policy sources; and the device policy manager system further comprising a sandbox security component, the sandbox security component configured to: permit the first policy source to access a first source policy store for the first policy source; permit the second policy source to access a second source policy store for the second policy source; restrict the first policy source from access to the second source policy store; and restrict the second policy source from access to the first source policy store.

Example 9

The mobile device according to any of Examples 1-8, the device policy manager system further comprising a resolution control component configured to control the conflict resolution technique used by the policy handler component for the policy based on a conflict resolution handling setting received from a particular policy source and an authority level of the particular policy source.

Example 10

The mobile device according to any of Examples 1-9, the device policy manager system further comprising a resolution control component configured to: arbitrate between conflict resolution handling settings received from two or more of the multiple policy sources based on respective authority levels of the two or more of the multiple policy sources to choose a selected conflict resolution handling setting; and control the conflict resolution technique used by the policy handler component for the policy based on the selected conflict resolution handling setting.

Example 11

The mobile device according to any of Examples 1-10, the device policy manager system further comprising a resolution control component configured to: receive a conflict resolution handling setting from a particular policy source; detect an established trust between the particular policy source and a trusted policy source of the mobile device; and responsive to detection of the established trust, control the conflict resolution technique used by the policy handler component for the policy based on the conflict resolution handling setting.

Example 12

The mobile device according to any of Examples 1-11, the device policy manager system further comprising: a state analysis component configured to detect whether a given conflict resolution technique used by the policy handler component to resolve the conflict for the policy causes an undesirable state of the mobile device; and a resolution control component configured to: control the conflict resolution technique used by the policy handler component for the policy based on whether the given conflict resolution technique causes the undesirable state; maintain the given conflict resolution technique as the conflict resolution technique based on the state analysis component detecting that the given conflict resolution technique does not cause the undesirable state; and modify the given conflict resolution technique to be the conflict resolution technique based on the state analysis component detecting that the given conflict resolution technique causes the undesirable state.

Example 13

The mobile device according to any of Examples 1-12, the internal policy source component comprising at least one of an application executed by the at least one processor of the mobile device or a device user interface of the mobile device.

Example 14

The mobile device according to any of Examples 1-13, the multiple policy sources further comprising a mobile operator management server, a messaging server, and a mobile device management server.

Example 15

The mobile device according to any of Examples 1-4, the policy handler component further configured to reevaluate the current policy value for the policy responsive to the mobile device un-enrolling from the first policy source.

Example 16

A mobile device, comprising: at least one processor; and computer-readable storage comprising a device policy manager system executable by the at least one processor, the device policy manager system comprising: a unified interface component configured to receive policy configuration requests from multiple policy sources and to receive a conflict resolution handling setting from a particular policy source; a resolution control component configured to control a conflict resolution technique for a policy based on the conflict resolution handling setting from the particular policy source and an authority level of the particular policy source; and a policy handler component configured to resolve a conflict between differing policy values for the policy specified in differing policy configuration requests provided by differing policy sources based on the conflict resolution technique for the policy controlled by the resolution control component, and to set a current policy value for the policy that controls the mobile device using the conflict resolution technique.

Example 17

The mobile device according to Example 16, the resolution control component further configured to arbitrate between the conflict resolution handling setting from the particular policy source and at least one disparate conflict resolution handling setting from at least one disparate policy source based on respective authority levels to choose a selected conflict resolution handling setting used to control the conflict resolution technique for the policy.

Example 18

The mobile device according to any of Examples 16-17, the resolution control component further configured to: detect an established trust between the particular policy source and a trusted policy source of the mobile device, wherein the particular policy source is prohibited from controlling the conflict resolution technique used by the policy handler component for the policy based on the authority level of the particular policy source in absence of the established trust; and responsive to detection of the established trust, control the conflict resolution technique used by the policy handler component for the policy based on the conflict resolution handling setting.

Example 19

A method of managing policies on a mobile device, comprising: receiving policy configuration requests from multiple policy sources, the multiple policy sources comprising at least an internal policy source executed by the mobile device and a device management server external to the mobile device, the policy configuration requests comprising at least: a first policy configuration request from a first policy source, the first policy configuration request comprising a first policy value for a policy; and a second policy configuration request from a second policy source, the second policy configuration request comprising a second policy value for the policy, the first policy source differing from the second policy source, and the first policy value conflicting with the second policy value; resolving the conflict between the first policy value and the second policy value for the policy based on a conflict resolution technique without trust between the first policy source and the second policy source being established on the mobile device; and responsive to resolving the conflict, setting a current policy value for the policy that controls the mobile device.

Example 20

The method according to Example 19, further comprising controlling the conflict resolution technique used to resolve the conflict for the policy.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A mobile device, comprising:
at least one processor; and
computer-readable storage that comprises computer-executable instructions that, when executed by the at least one processor, cause the at least one processor to perform acts including:
 receiving policy configuration requests from multiple policy sources, the policy configuration requests comprising at least:
  a first policy configuration request from a first policy source, the first policy configuration request comprising a first policy value for a policy; and
  a second policy configuration request from a second policy source, the second policy configuration request comprising a second policy value for the policy, the first policy source differing from the second policy source, and the first policy value conflicting with the second policy value; and
 resolving the conflict between the first policy value and the second policy value for the policy based on a conflict resolution technique to set a current policy value for the policy that controls the mobile device, the conflict between the first policy value and the second policy value for the policy being resolved without trust between the first policy source and the second policy source being established on the mobile device.

2. The mobile device of claim 1, wherein:
the first policy configuration request further comprises an identifier of the first policy source and an indicator that specifies the policy;
the second policy configuration request further comprises an identifier of the second policy source and the indicator that specifies the policy; and
the identifier of the first policy source differs from the identifier of the second policy source.

3. The mobile device of claim 1, the conflict resolution technique specifying respective authority levels for policy source types, and the computer-readable storage further comprises computer-executable instructions that, when executed by the at least one processor, cause the at least one processor to perform acts including:
 using the conflict resolution technique to set the current policy value for the policy based on a first authority level of the first policy source and a second authority level of the second policy source.

4. The mobile device of claim 3, the conflict resolution technique specifying the respective authority levels for the policy source types for a group of policies, the group of policies comprising the policy, and the conflict resolution technique specifying differing respective authority levels for the policy source types for a differing group of policies that lacks the policy.

5. The mobile device of claim 1, the first policy source being an enterprise device management server having a given authority level, the conflict resolution technique specifying a prohibition of policy sources having the given authority level from setting the current policy value of the policy, the first policy configuration request being a signed policy configuration request signed by a trusted policy source of the mobile device, and the computer-readable storage further comprises computer-executable instructions that, when executed by the at least one processor, cause the at least one processor to perform acts including:
 overriding the prohibition specified by the confliction resolution technique based on the signed policy configuration request.

6. The mobile device of claim 1, the computer-readable storage further comprising a policy manager metabase store; and
the computer-readable storage further comprises computer-executable instructions that, when executed by the at least one processor, cause the at least one processor to perform acts including:
 writing the first policy value for the policy to a first source policy store of the policy manager metabase store, the first source policy store corresponding to the first policy source;
 writing the second policy value for the policy to a second source policy store of the policy manager metabase store, the second source policy store corresponding to the second policy source;
 determining the current policy value for the policy using the conflict resolution technique based at least on the first policy value from the first source policy store and the second policy value from the second source policy store; and
 writing the current policy value for the policy to a current policy store of the policy manager metabase store.

7. The mobile device of claim 1, the computer-readable storage further comprising a policy manager metabase store, the policy manager metabase store comprising respective policy stores for the multiple policy sources; and
the computer-readable storage further comprises computer-executable instructions that, when executed by the at least one processor, cause the at least one processor to perform acts including:
 permitting the first policy source to access a first source policy store for the first policy source;
 permitting the second policy source to access a second source policy store for the second policy source;
 restricting the first policy source from access to the second source policy store; and
 restricting the second policy source from access to the first source policy store.

8. The mobile device of claim 1, the computer-readable storage further comprises computer-executable instructions that, when executed by the at least one processor, cause the at least one processor to perform acts including:
 controlling the conflict resolution technique used by the mobile device for the policy based on a conflict resolution handling setting received from a particular policy source and an authority level of the particular policy source.

9. The mobile device of claim 1, the computer-readable storage further comprises computer-executable instructions that, when executed by the at least one processor, cause the at least one processor to perform acts including:
 arbitrating between conflict resolution handling settings received from two or more of the multiple policy sources based on respective authority levels of the two or more of the multiple policy sources to choose a selected conflict resolution handling setting; and
 controlling the conflict resolution technique used by the mobile device for the policy based on the selected conflict resolution handling setting.

10. The mobile device of claim 1, the computer-readable storage further comprises computer-executable instructions that, when executed by the at least one processor, cause the at least one processor to perform acts including:
- receiving a conflict resolution handling setting from a particular policy source;
- detecting an established trust between the particular policy source and a trusted policy source of the mobile device; and
- responsive to detection of the established trust, controlling the conflict resolution technique used by the mobile device for the policy based on the conflict resolution handling setting.

11. The mobile device of claim 1, the computer-readable storage further comprises computer-executable instructions that, when executed by the at least one processor, cause the at least one processor to perform acts including:
- detecting whether a given conflict resolution technique used by the mobile device to resolve the conflict for the policy causes an undesirable state of the mobile device; and
- controlling the conflict resolution technique used by the mobile device for the policy based on whether the given conflict resolution technique causes the undesirable state, controlling the conflict resolution technique used by the mobile device for the policy further comprises:
  - maintaining the given conflict resolution technique as the conflict resolution technique based on detecting that the given conflict resolution technique does not cause the undesirable state; and
  - modifying the given conflict resolution technique to be the conflict resolution technique based on detecting that the given conflict resolution technique causes the undesirable state.

12. The mobile device of claim 1, the multiple policy sources further comprising a mobile operator management server, a messaging server, and a mobile device management server.

13. The mobile device of claim 1, the computer-readable storage further comprises computer-executable instructions that, when executed by the at least one processor, cause the at least one processor to perform acts including:
- reevaluating the current policy value for the policy responsive to the mobile device un-enrolling from the first policy source.

14. A mobile device, comprising:
- at least one processor; and
- computer-readable storage that comprises computer-executable instructions that, when executed by the at least one processor, cause the at least one processor to perform acts including:
  - receiving a conflict resolution handling setting from a particular policy source, the conflict resolution handling setting specifies a conflict resolution technique for a policy;
  - controlling the mobile device to use the conflict resolution technique for the policy based on the conflict resolution handling setting from the particular policy source and an authority level of the particular policy source;
  - receiving configuration requests from multiple policy sources, the configuration requests being separate from the conflict resolution handling setting, the configuration requests comprise differing policy configuration requests provided by differing policy sources that specify differing policy values for the policy; and
  - resolving a conflict between the differing policy values for the policy specified in the differing policy configuration requests provided by the differing policy sources based on the conflict resolution technique used by the mobile device for the policy to set a current policy value for the policy that controls the mobile device.

15. The mobile device of claim 14, the computer-readable storage further comprises computer-executable instructions that, when executed by the at least one processor, cause the at least one processor to perform acts including:
- arbitrating between the conflict resolution handling setting from the particular policy source and at least one disparate conflict resolution handling setting from at least one disparate policy source based on respective authority levels to choose a selected conflict resolution handling setting used to control the conflict resolution technique for the policy.

16. The mobile device of claim 14, the computer-readable storage further comprises computer-executable instructions that, when executed by the at least one processor, cause the at least one processor to perform acts including:
- detecting an established trust between the particular policy source and a trusted policy source of the mobile device, wherein the particular policy source is prohibited from controlling the conflict resolution technique used by the mobile device for the policy based on the authority level of the particular policy source in absence of the established trust; and
- responsive to detection of the established trust, controlling the conflict resolution technique used by the mobile device for the policy based on the conflict resolution handling setting.

17. A method of managing policies on a mobile device, comprising:
- receiving policy configuration requests from multiple policy sources, the multiple policy sources comprising at least an internal policy source executed by the mobile device and a device management server external to the mobile device, the policy configuration requests comprising at least:
  - a first policy configuration request from a first policy source, the first policy configuration request comprising a first policy value for a policy; and
  - a second policy configuration request from a second policy source, the second policy configuration request comprising a second policy value for the policy, the first policy source differing from the second policy source, and the first policy value conflicting with the second policy value;
- resolving the conflict between the first policy value and the second policy value for the policy based on a conflict resolution technique without trust between the first policy source and the second policy source being established on the mobile device; and
- responsive to resolving the conflict, setting a current policy value for the policy that controls the mobile device.

18. The method of claim 17, further comprising controlling the conflict resolution technique used to resolve the conflict for the policy.

19. The mobile device of claim 1, the multiple policy sources comprising at least an internal policy source configured to be executed by the at least one processor of the mobile device and a device management server external to the mobile device.

20. The mobile device of claim 19, the internal policy source comprising at least one of an application executed by the at least one processor of the mobile device or a device user interface of the mobile device.

* * * * *